US011609916B1

(12) United States Patent
Roy et al.

(10) Patent No.: US 11,609,916 B1
(45) Date of Patent: Mar. 21, 2023

(54) ROBOTICS APPLICATION DEVELOPMENT AND MONITORING OVER DISTRIBUTED NETWORKS

(71) Applicant: Amazon Technologies, Inc., Seattle, WA (US)

(72) Inventors: Gourav Roy, Seattle, WA (US); Ritesh Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 16/449,182

(22) Filed: Jun. 21, 2019

(51) Int. Cl.
*G06F 16/245* (2019.01)
*G06F 9/54* (2006.01)
*G06F 16/242* (2019.01)

(52) U.S. Cl.
CPC ........ *G06F 16/24569* (2019.01); *G06F 9/546* (2013.01); *G06F 16/2445* (2019.01)

(58) Field of Classification Search
CPC .......... G06F 16/2445; G06F 16/24569; G06F 9/546; G06F 21/30–46; H04L 9/32–3297
See application file for complete search history.

(56) References Cited

U.S. PATENT DOCUMENTS

| | | | | |
|---|---|---|---|---|
| 8,406,926 | B1 * | 3/2013 | Lewis | G06Q 30/02 700/259 |
| 2008/0256616 | A1 * | 10/2008 | Guarraci | H04L 63/08 726/5 |
| 2017/0142108 | A1 * | 5/2017 | Zhang | H04L 63/0823 |
| 2017/0206554 | A1 * | 7/2017 | Craft | H04L 51/18 |
| 2020/0153818 | A1 * | 5/2020 | Chauhan | G06F 21/335 |
| 2020/0204618 | A1 * | 6/2020 | Agarwal | H04L 9/0643 |
| 2020/0358615 | A1 * | 11/2020 | Smolny | H04L 63/083 |
| 2021/0051012 | A1 * | 2/2021 | Law | G06Q 20/4014 |

* cited by examiner

*Primary Examiner* — Robert W Beausoliel, Jr.
*Assistant Examiner* — Nirav K Khakhar
(74) *Attorney, Agent, or Firm* — Davis Wright Tremaine LLP

(57) ABSTRACT

A robotic device management service obtains, from a client device operating in a first network, a request to obtain data from a robotic device operating in a second network. In response to the request, the robotic device management service issues a token to the client device that can be provided in future queries to obtain the data. The robotic device management service provides parameters of the request to the robotic device to cause the robotic device to generate and provide the data to the robotic device management service. In response to another request to obtain the data, where the other request includes the token, the robotic device management service queries a database to determine whether the data is available from a storage location of the service. If the data is available, the service provides the data to the client device to fulfill the other request.

20 Claims, 8 Drawing Sheets

ROBOTICS APPLICATION DEVELOPMENT AND MONITORING OVER DISTRIBUTED NETWORKS

BACKGROUND

Autonomous devices and other robotic devices are becoming ubiquitous in the day-to-day lives of many users in recent times. For instance, much research and development is being invested in autonomous vehicles for passengers, freight, and other purposes. Robotic devices are also utilized in manufacturing to reduce costs and expedite the manufacturing process. However, developing the applications required by these autonomous devices and other robotic devices can be difficult and time consuming. For instance, testing and simulating a robotic device application can require significant resources and significant trial-and-error to ensure that the robotic device application will perform correctly when installed on to autonomous and other robotic devices. Further, robotic devices may require significant computational resources to perform various operations, which may make it difficult to test applications directly on these robotic devices.

BRIEF DESCRIPTION OF THE DRAWINGS

Various techniques will be described with reference to the drawings, in which.

DETAILED DESCRIPTION

Figure 1:
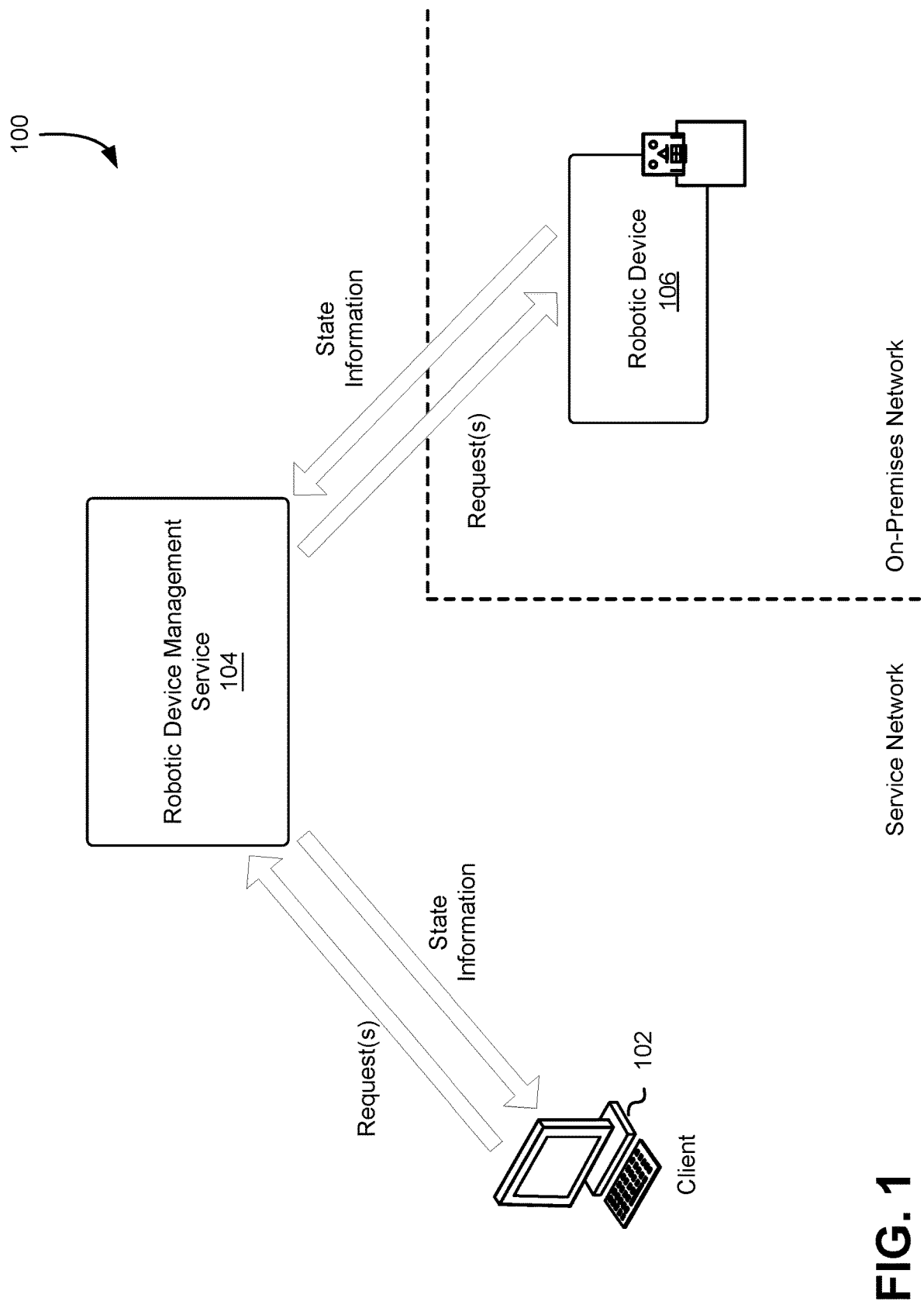
FIG. 1 shows an illustrative example of a system in which various embodiments can be implemented.

Techniques described and suggested herein relate to a development architecture for generating and simulating robotics device applications over different distributed networks. In an example, a customer of a robotic device management service transmits, via a client device agent installed on a client device of the customer operating within a first network, a request to the robotic device management service to obtain state information of a robotic device operating in a second network. The customer may generate, through its client device, a robotic device application utilizing Robot Operating System (ROS) tools and libraries provided by the robotic device management service, provided by a third-party service or supplier, or generated by the customer itself through the client device. The customer may register this robotic device application with the robotic device management service, which may store the robotic device application generated by the customer in a data object provided by an object-based data storage service. In an example, the robotic device application can be deployed to a designated fleet of robotic devices in response to a request from the customer to make the application available to the fleet. This may cause the designated fleet of robotic devices to execute the application and generate state information associated with execution of the application.

In one example, the client device agent obtains, from the robotic device management service and in response to the request to retrieve state information of a robotic device, metadata specifying the state information that is available from the robotic device that the customer wishes to interact with. This metadata may be generated by the robotic device, which may indicate what state information is being generated per execution of robotic device applications installed on the robotic device. Based on the information specified in the metadata, the client device agent may determine whether the state information requested by the customer via the client device is available or can otherwise be obtained through the robotic device management service. If the requested state information is not available, the client device agent may deny the request from the customer. However, if the requested state information is available or may otherwise be obtained from the robotic device, the client device agent may register the request with the robotic device management service. The robotic device management service may add the parameters of the request to a queue or other data repository accessible by the robotic device. This may cause the robotic device to obtain these parameters of the request and generate the requested state information.

In one example, the robotic device management service issues, to the client device agent, a token corresponding to the request from the customer to obtain state information from the robotic device operating in another network. The client device agent may query the robotic device management service using this token to obtain the state information provided by the robotic device to the robotic device management service over time. The token may include an identifier corresponding to the parameters of the state information to be obtained, as well as information usable to identify the robotic device from which the state information is to be obtained. In response to obtaining the token from the client device agent, the robotic device management service may evaluate the token and determine whether it is valid (e.g., has not expired, is authentic, etc.). If the token is valid, the robotic device management service may determine whether the state information indicated in the token is available. For instance, the robotic device management service may evaluate a queue that specifies the various state information from different robotic devices that are available to determine whether the requested state information has been provided by the corresponding robotic device. If so, the robotic device management service may obtain the requested state information from a state information database maintained by the robotic device management service and provide the requested state information to the client device agent. The robotic device management service may update the queue to remove the entry corresponding to the provided state information. This may serve as an indication that the state information has been provided to the token bearer (e.g., the client device agent).

In one example, the robotic device agent installed on the robotic device queries the robotic device management service to determine whether there are any requests available for state information to be processed. For instance, the robotic device management service may maintain a queue specifying parameters corresponding to requests obtained from client devices for state information from the robotic device. If the robotic device agent determines that request parameters are available from the queue, the robotic device agent may obtain these request parameters and identify which compute nodes of the robotic device generate and maintain the state information corresponding to these request parameters. The robotic device agent may transmit the requested state information to the robotic device management service, which may update the state information database to incorporate this newly obtained state information. In an example, the robotic device management service overwrites any previously provided state information corresponding to the request parameters provided to the robotic device agent with the newly obtained state information. The robotic device agent may continue to provide this state information to the robotic device management service as it is generated unless a disconnect command is obtained from the robotic device management service.

In one example, the customer, through the client device agent, can transmit a Structured Query Language (SQL) query or other executable instructions to the robotic device management service to cause a robotic device to generate state information and process this state information to generate data that may be of benefit to the customer. The robotic device management service may add the query parameters or executable instructions to a queue for the robotic device. Thus, as the robotic device agent processes the parameters specified in the queue, the robotic device agent may obtain the SQL query or other executable instructions and process the corresponding state information in accordance with the parameters of the query or other executable instructions. The robotic device agent may provide the output of this process to the robotic device management service, which may add this output to the queue accessible by the client device agent. The client device agent may retrieve this output from the queue and update the tool accordingly.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, because the robotic device management service serves as an intermediary between the client device of a customer and the robotic device, the client device of the customer and the robotic device need not be within the same communications network in order to interact with one another. This provides greater flexibility for the customer to interact with a robotic device from any location so long as it has connectivity to the robotic device management service. Further, because the client device can be used to transmit SQL queries or other executable instructions for processing state information on the robotic device, the amount of data transmitted from the robotic device to the robotic device management service for distribution to the client device may be reduced. This has the benefit of reducing the network bandwidth required to provide the requested data to the client device in response to a customer request for data from the robotic device.

FIG. 1 shows an illustrative example of a system 100 in which various embodiments can be implemented. In the system 100, a customer of the robotic device management service 104, through a client device 102, submits a request to the robotic device management service 104 to obtain state information of a robotic device 106 operating within an on-premises network or other communications network distinct from the network of the client device 102. The robotic device management service 104 may comprise a collection of computing resources that collectively operate to enable customers of the robotic device management service 104 to communicate with robotic devices 106 in other communications networks, obtain state information from these robotic devices 106 through the robotic device management service 104, and to provide customers with flexibility to generate their own ROS tools and libraries using their own client devices 102 and utilize these ROS tools and libraries locally to process state information from the robotic devices 106. For example, through the client device 102, a customer may define a robotic device application that leverages services that convert text into speech, which may be used to enable communication between the robotic device 106 and the customer using natural language understanding (NLU). Additionally, the customer may define an application that leverages a video streaming service of the computing resource service provider to enable real-time streaming of video captured by the robotic device 106 to the client device 102 via the robotic device management service 104. Thus, the robotic device management service 104 may serve to coordinate interactions between the client device 102 and the robotic device 106.

For each robotic device 106, the robotic device management service 104 may establish a communications channel between the robotic device 106 and the robotic device management service 104 to enable communications between the robotic device 106, via a robotic device agent, and the robotic device management service 104. For instance, the robotic device 106 may transmit a request, over this communications channel, to the robotic device management service 104 to access a set of resources provided by the service 104 or by other computing resource services. Through the communications channel, the robotic device 106, via a robotic device agent, may further provide data usable by the customer to evaluate the performance of the robotic device 106 as it executes a set of operations. For instance, the robotic device 106, via the robotic device agent, may transmit state information of the robotic device 106 over the communications channel to the robotic device management service 104. The customer, through the client device agent installed on its client device 102, may access the state information from the robotic device management service 104.

In an embodiment, the customer, through the robotic device management service 104, can register a set of robotic devices 106 with the robotic device management service 104 to enable organization of these robotic devices 106 into logical groupings that may be maintained by the robotic device management service 104. Robotic devices 106 may include autonomous devices (e.g., "driverless" vehicles, appliances, unmanned aerial vehicles, space exploration vehicles, satellites, etc.) that may perform operations based on sensor data collected via analysis of a surrounding environment of the autonomous devices. It should be noted that robotic devices, as described throughout the disclosure, may refer to physical robotic devices and/or to simulated robotic devices, which may be a representation of the physical robotic devices but in a simulated environment. Through the robotic device management service 104, the customer may utilize various application programming interface (API) calls to register a new robotic device 106. For example, the customer may submit, through use of a RegisterDevice( ) API call, a unique name for the robotic device 106 that may be used to associate the robotic device 106 with the customer's account. In an embodiment, the RegisterDevice( ) API call is required for registration of the robotic device and the name of the robotic device, a unique Internet-of-Things (IoT) name of the robotic device, and the name of the logical grouping to which the robotic vehicle belong to is provided as a string. For instance, the customer may submit, through use of an RegisterDevice( ) API call, a unique IoT name for the robotic device 106, which may be used to establish the encrypted communications channel between the robotic device management service 104 and the robotic device 106. Additionally, through the RegisterDevice( ) API, the customer may define the logical grouping that the robotic device 106 is to be a part of. This logical grouping may be an existing grouping of robotic devices 106 previously created by the customer or a new logical grouping that the customer has defined. In an embodiment, the customer can also submit, through use of the RegisterDevice( ) API call, information that can be used to establish a shared secret between the robotic device 106 and the robotic device management service 104. For instance, the customer may provide a password, cryptographic key, digital certificate, or other array of bytes that may be used as a shared secret between the robotic device 106 and the robotic device management service 104 to allow for secure communications between the robotic device 106 and the robotic device management service 104. The API call may be also used to initiate a key exchange according to a key agreement protocol, such as: the Diffie-Hellman key exchange, exponential key exchange, password-authenticated key agreement protocols, and the like. Alternatively, the robotic device 106 and the robotic device management service 104 may establish, in response to the RegisterDevice( ) API call, their own shared secret, which may be utilized to allow for secure communications between the robotic device 106 and the robotic device management servicer 104.

In an embodiment, a client device agent is provided by the robotic device management service 104 for installation on the client device 102. This client device agent may be implemented as a process or other executable code that, if executed, serves as a conduit for customer-generated ROS tools and libraries to transmit commands and other requests to the robotic device management service 104 for transmission to the robotic device 106 for execution of the commands or to cause the robotic device 106 to generate and provide state information usable by the customer-generated ROS tools and libraries to determine the state of the robotic device 106 operating in the on-premises or other communications network. In an embodiment, the robotic device management service 104 exposes an API command to the client device agent that enables the client device agent to submit a request to the robotic device management service 104 to register a newly created or existing ROS tool operating on the client device 102. The robotic device management service 104, in response to the request from the client device agent to register a ROS tool implemented on the client device 102, may store information related to the ROS tool within a customer account. This information may specify the one or more robotic devices 106 that the ROS tool may require to provide state information, provide configuration information of the robotic device 106, or other data usable to perform a set of operations for optimizing the robotic devices 106. For instance, an ROS tool may utilize state information related to the battery performance of a robotic device 106 to determine whether the battery performance is within acceptable parameters or whether changes to the configuration of the robotic device 106 are required to achieve optimal battery performance on the robotic device 106. Further, an ROS tool may utilize configuration information of the robotic device 106 to identify the configuration of the robotic device 106 at a given time so as to determine whether to make any changes to the configuration of the robotic device 106.

The client device agent installed on the client device 102 may expose a set of API commands that may be invoked by an ROS tool implemented on the client device 102 to request state information from a robotic device 106 or otherwise cause the robotic device 106 to perform a set of operations. For example, the client device agent may expose a ListTopics( ) API command that may be used to cause the robotic device 106 to indicate the various topics to which the processors of the robotic device 106 are publishing state information into. These topics may be organized based on the underlying state information being published therein. For instance, a topic may have an identifier that indicates that it is utilized for publishing state information related to battery performance. Another topic may have an identifier that indicates that it is utilized for publishing state information related to temperature readings from the robotic device. Thus, through the client device agent, an ROS tool may submit an API call to the robotic device management service 104 to identify the various topics being exposed by the robotic device 106 for obtaining state information of the robotic device 106.

The client device agent may also, for example, expose a GetData( ) API command that may be used by an ROS tool on the client device 102 to request state information from a particular topic and provided by the robotic device 106. This API command may specify an identifier of the topic from which the state information is to be obtained, as well as an identifier of the robotic device 106 that publishes the state information to the specified topic. Additionally, or alternatively, the client device agent may expose a PutData( ) API command that may be used by an ROS tool on the client device 102 to transmit data generated via the ROS tool to the robotic device 106. This data may include executable instructions, SQL queries, and the like. Further, this data may be used to cause the robotic device 106 to perform various operations, including actions that may cause the robotic device 106 to generate additional state information that may be processed by the ROS tool on the client device 102. While state information is described extensively throughout the present disclosure, other information may be requested or transmitted by the ROS tool of the client device 102 through the aforementioned API commands. For instance, the ROS tool may use the GetData( ) API command to request configuration information from the robotic device 106, which may be used to determine the configuration of the robotic device 106 at a given point in time. Further, the ROS tool may use a PutData( ) API command to transmit new configuration information generated via the ROS tool to the robotic device 106. This new configuration information may be used by the robotic device 106 to update its own configuration in accordance with the executable instructions or other commands specified in the new configuration information.

In an embodiment, the ROS tool on the client device 102 submits an API call to the client device agent to identify the various topics available from a particular robotic device 106. The API call may specify an identifier corresponding to the robotic device 106 from which the ROS tool may want to obtain state information from or publish data to. In response to this API call, the client device agent may access the robotic device management service 104 and submit this API call to the robotic device management service 104 to identify the topics available from the robotic device 106. In an embodiment, the robotic device 106 has installed a robotic device agent that provides information to the robotic device management service 104 regarding the topics available on the robotic device 106 as well as state information generated by the robotic device 106 via execution of various commands and applications installed on the robotic device 106. The robotic device agent may also obtain data, SQL queries, and executable instructions from the robotic device management service 104 that may be used to execute various operations or as input for determining which operations to perform.

In an embodiment, the robotic device management service 104 stores, within a database, information specifying the various topics made available by the robotic device 106 to which state information is published and from which the state information may be obtained by the robotic device management service 104 for distribution to client devices, such as client device 102. In response to the API call from the client device agent to identify the various topics available from the robotic device 106, the robotic device management service 104 may query the database to determine whether there are any topics available from the specified robotic device 106. If there are topics available from the specified robotic device 106, the robotic device management service 104 may provide information specifying identifiers of the available topics to the client device agent on the client device 102. In turn, the client device agent may provide this information to the ROS tool on the client device 102, which may utilize this information to determine what state information or other data may be obtained from the robotic device 106.

The ROS tool or other application on the client device 102 may also submit an API call to the client device agent to obtain data, such as state information, from the robotic device 106. This API call may specify an identifier of the robotic device 106 from which the data is to be obtained, as well as an identifier corresponding to the topic that is used by the robotic device 106 to publish the requested data. The client device agent may transmit this API call from the ROS tool or other application to the robotic device management service 104. In response to the API call, the robotic device management service 104 may generate a token that may be used by the client device agent to query, over time, the robotic device management service 104 to obtain the requested state information from the particular topic. The robotic device management service 104 may provide this token to the client device agent, which may be used to query the robotic device management service 104 periodically or in response to a triggering event (e.g., request from the ROS tool, detection of an incident within the on-premises network of the robotic device 106, etc.), to obtain state information of the robotic device 106. The robotic device management service 104 may also register this received API call or other request within its database to indicate that a request has been received to obtain state information from the robotic device 106. The registration of the request may result in an entry in the database that specifies an identifier of the token issued to the client device 102, as well as the parameters of the request to obtain the state information (e.g., topic from which state information is to be obtained, identifier of the robotic device 106, identifier of the client device 102 and/or ROS tool, conditions for terminating further retrieval of state information from the robotic device 106, and the like).

In an embodiment, the robotic device agent queries the robotic device management service 104 to determine whether any requests have been obtained by the robotic device management service 104 to obtain state information or other data from the robotic device 106. These queries may be made by the robotic device agent periodically or in response to a triggering event (e.g., the robotic device 106 encounters a fault or other issue that impacts performance of the robotic device 106, etc.). In response to a query from the robotic device agent for obtained requests from client devices, such as client device 102, the robotic device management service 104 may query its database to identify any entries corresponding to any pending requests obtained by the robotic device management service 104 for retrieval of state information or other data from the robotic device 106. If the robotic device management service 104 identifies one or more requests for the robotic device 106 to provide state information or other data to a client device 102, the robotic device management service 104 may transmit parameters of these requests to the robotic device agent of the robotic device 106.

If the robotic device agent determines, based on the response from the robotic device management service 104, that one or more requests have been made by a client device 102 to obtain state information or other data from the robotic device 106, the robotic device agent may submit a PutData( ) API call to the robotic device management service 104 to provide the requested state information or other data. The robotic device management service 104 may store this state information or other data in the database such that this state information or other data is associated, in an entry, with the corresponding request made by the client device 102 to obtain this state information or data. Thus, in response to a query from the client device agent of the client device 102 to obtain this state information or data, the robotic device management service 104 may evaluate the token provided in the query to identify the corresponding entries in the database associated with the original request to retrieve the state information or data from the robotic device 106. Further, the robotic device management service 104 use the information in the entries to locate the corresponding state information or data, which the robotic device management service 104 can provide to the client device agent in response to the query.

In an alternative embodiment, in response to the API call from the ROS tool or other application on the client device 102, the robotic device management service 104 establishes a communications session with another computer system that obtains data from the robotic device 106. For instance, the client device 102 may be connected to a first computer system of the robotic device management service 104 while the robotic device 106 may be connected to a second computer system of the robotic device management service 104. In response to the API call or other request from the client device 102, the robotic device management service 104 may establish a communications session between the first computer system and the second computer system. The robotic device management service 104 may issue, to the client device 102, a unique communications session identifier that may be used to re-establish the communications session should the communications session between the first computer system and the second computer system is terminated or otherwise disconnected. Further, the second computer system may maintain a queue, where data from the robotic device 106 may be stored in the event that the communications session is terminated or the client device 102 is otherwise unable to obtain the data from the robotic device management service 104. In an embodiment, if the client device 102 no longer requires data from the robotic device 106 (e.g., the client device 102 transmits, via its agent, a notification to the robotic device management service 104 indicating that data from the robotic device 106 is no longer required, etc.), the robotic device management service 104 transmits an API call or other request to the robotic device agent of the robotic device 106 to cease transmission of data to the second computer system, as the data is no longer required. Further, the robotic device management service 104 may terminate the communications session between the first computer system and the second computer system.

In an embodiment, the robotic device 106 includes a robotic device core that may monitor execution of the various processors or nodes of the robotic device 106 to obtain state information and data published by these processors or nodes to the various topics maintained by the robotic device 106. Each individual processor or node may be subscribed to one or more topics maintained by the robotic device 106 such that a processor or node may interact with a topic it is subscribed to in order to publish state information to the topic or obtain data published to the topic by the robotic device agent, which may obtain such data from the client device 102 via the robotic device management service 104. The robotic device core may maintain a mapping of the various processors or nodes of the robotic device 106 and the various topics to which the processors or nodes are publishing state information and obtaining data published to the topics by the robotic device agent. This mapping may be stored by the robotic device core in the form of metadata, which the robotic device core may use to determine which processors or nodes are publishing state information or other data to each topic and which processors or nodes are obtaining data from each topic. In an embodiment, a processor or node may interact with the robotic device core to identify which other processor or node is interacting with a particular topic or generating particular state information. This may allow the processor or node to interact with other processors or nodes as needed for generation of state information, publishing state information to a particular topic, or obtaining data from a particular topic. In an embodiment, the robotic device agent obtains the metadata from the robotic device core to determine which processor or node has generated the state information or data published to a particular topic. Thus, based on the metadata, the robotic device agent may access the processor or node that maintains the published state information or data for a particular topic and transmit this state information or data to the robotic device management service 104 to make the state information or data available to the client device 102.

In an embodiment, the robotic device agent continues to provide state information in response to previously obtained request parameters from the robotic device management service 104 until a disconnect command is obtained from the robotic device management service 104. If the robotic device agent obtains a disconnect command from the robotic device management service 104, the robotic device agent may cease transmission of state information associated with the request specified in the disconnect command. The disconnect command may be submitted to the robotic device management service 104 by the client device agent of a client device 102. For instance, a customer may determine that it has obtained sufficient data from the robotic device 106 for evaluation of an application installed on the robotic device 106. As such, the customer, via the client device 102 and the client device agent, may submit a disconnect command to cease communication with the robotic device 106 and to stop obtaining state information from the robotic device 106. The robotic device management service 104 may transmit this disconnect command to the robotic device agent, which may cease further transmission of state information associated with the original request from the client device 102 for such state information.

In an embodiment, the state information generated by the processors or nodes of the robotic device 106 are prepared utilizing a structured language, such as SQL. A customer of the robotic device management service 104 may submit, via the client device agent installed on the client device 102, an SQL query or executable instructions to the robotic device management service 104 that, if executed by the robotic device 106, causes the robotic device 106 to process the state information corresponding to the parameters defined in the SQL query or executable instructions and provide the output generated as a result of processing the state information in accordance with the SQL query or executable instructions. Thus, rather than the robotic device agent transmitting the complete state information to the robotic device management service 104 in response to a request from the client device agent to obtain this state information, the robotic device agent may provide processed data that may provide an output to a particular SQL query or other executable instruction from the client device agent. This enables processing of the state information to be performed on the robotic device 106 itself rather than by the ROS tool or other application on the client device 102.

The robotic device agent may evaluate any obtained SQL query or executable instructions obtained from the robotic device management service 104 for processing of state information to determine whether the execution of the SQL query or executable instructions would consume a greater amount of compute resources (e.g., memory, processing capacity, storage capacity, etc.) of the robotic device 106 than a maximum threshold amount. If the compute resources required to process the state information is greater than this maximum threshold, the robotic device agent may transmit a notification to the robotic device management service 104 to indicate that the SQL query or executable instruction cannot be processed by the robotic device 106. However, if the compute resources required to execute the SQL query or executable instruction is lower than the maximum threshold, the robotic device agent may execute the SQL query or executable instruction to process the state information and provide the output of this processing of the state information to the robotic device management service 104 for distribution to the client device 102.

Figure 2:
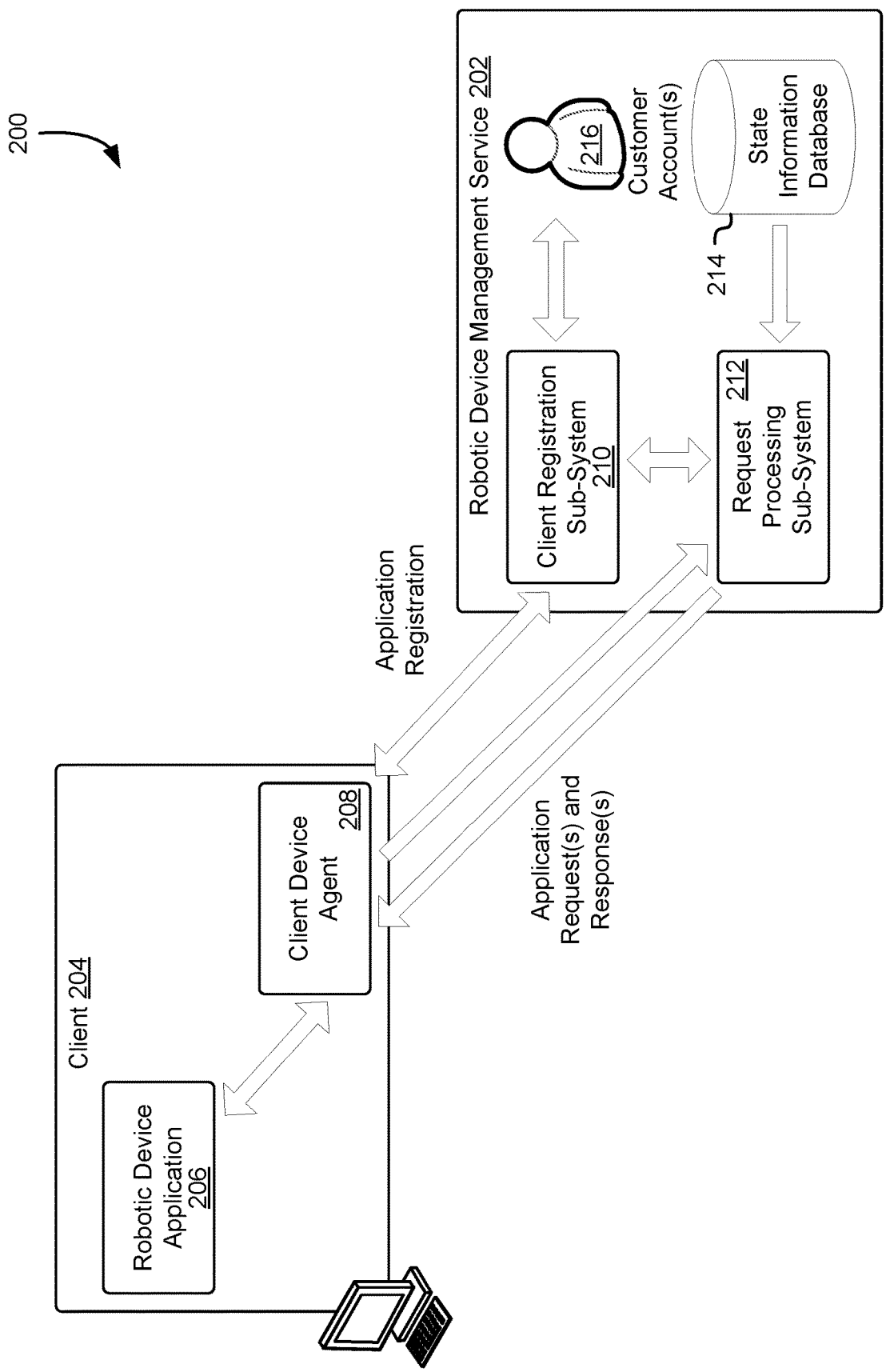
FIG. 2 shows an illustrative example of a system in which a client device, via a client device agent, registers a robotic device application and obtains state information for a set of robotic devices executing a set of operations in accordance with at least one embodiment.

As noted above, a client device may have installed a client device agent that may serve as a conduit between a robotic device application (e.g., ROS tool or library) installed on the client device and a robotic device management service to obtain state information and other data from a robotic device operating within another communications network or otherwise remotely from the client device. The client device agent may register the robotic device application with the robotic device management service and submit requests on behalf of the robotic device application to obtain particular state information from one or more robotic devices registered by a customer of the robotic device management service with the service. Accordingly, FIG. 2 shows an illustrative example of a system 200 in which a client device 204, via a client device agent 208, registers a robotic device application 206 and obtains state information for a set of robotic devices executing a set of operations in accordance with at least one embodiment.

In the system 200, a client device agent 208 installed on a client device 204 transmits a request to a client registration sub-system 210 of a robotic device management service 202 to register a robotic device application 206 with the service 202. The client device agent 208 may be implemented as a process or other executable code that, if executed, serves as a conduit for customer-generated robotic device applications 206 operating on the client device 204 to transmit commands and other requests to the robotic device management service 202 for transmission to robotic devices for execution of the commands or to cause the robotic devices to generate and provide state information usable by the robotic device applications 206 to determine the state of the robotic devices operating in the on-premises or other communications network.

In an embodiment, the client registration sub-system 210 of the robotic device management service 202 exposes an API command to the client device agent 208 that enables the client device agent 208 to submit a request to the client registration sub-system 210 to register a newly created or existing robotic device application 206 operating on the client device 204. The client registration sub-system 210 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The client registration sub-system 210, in response to the request from the client device agent 208 to register a robotic device application 206 operating on the client device 204, may store information related to the robotic device application 206 within a customer account 216 of the customer. This information may specify the one or more robotic devices that the robotic device application 206 may require to provide state information or other data usable to perform a set of operations for optimizing the robotic devices.

As noted above, the client device agent 208 installed on the client device 204 may expose a set of API commands that may be invoked by the robotic device application 206 to request state information from a robotic device or otherwise cause the robotic device to perform a set of operations. For example, the client device agent 208 may expose a ListTopics( ) API command that may be used to cause the robotic device to indicate the various topics to which the processors of the robotic device are publishing state information into. These topics may be organized based on the underlying state information being published therein. Thus, through the client device agent 208, a robotic device application 206 may submit an API call to the request processing sub-system 212 of the robotic device management service 202 to identify the various topics being exposed by the robotic device for obtaining state information of the robotic device. The request processing sub-system 212 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

The ListTopics( ) API call may specify an identifier corresponding to the one or more robotic devices for which the robotic device application 206 may require state information or other data. In response to obtaining this API call, the request processing sub-system 212 may interact with the client registration sub-system 210 to determine whether the robotic device application 206 that originally submitted the API call to the client device agent 208 is authorized to obtain a listing or other ordering of topics exposed by the specified robotic devices. For instance, the client registration sub-system 210 may access the customer account 216 associated with the client device agent 208 to identify the applications registered with the robotic device management service 202 as well as the robotic devices that the customer may access via these applications.

If the robotic device application 206 is registered with the robotic device management service 202 and is authorized to access the specified robotic devices, the request processing sub-system 212 may query a state information database 214 of the robotic device management service 202 to identify the topics to which the specified robotic devices are publishing state information and other data of the robotic devices. For example, a robotic device registered with the robotic device management service 202 may transmit, via a robotic device agent installed on the robotic device, information specifying the various topics to which state information and other data is published. This information may be stored in the state information database 214, which may include an entry corresponding to the robotic device. Thus, in response to a ListTopics( ) API call, the request processing sub-system 212 may query the state information database 214 to identify an entry corresponding to each robotic device specified in the API call. From these entries, the request processing sub-system 212 may identify the topics maintained by each of the specified robotic devices and provide this information to the client device agent 208 to fulfill the request from the robotic device application 206. In an embodiment, if an entry corresponding to a robotic device does not specify which topics are maintained by the robotic device, the request processing sub-system 212 may transmit a request to the robotic device agent to obtain a listing or other ordering of the topics maintained by the robotic device. If the robotic device agent returns a listing or other ordering of the topics maintained by the robotic device, the request processing sub-system 212 may update the entry corresponding to the robotic device in the state information database 214 to indicate which topics are maintained by the robotic device. Further, the request processing sub-system 212 may provide this listing or other ordering to the client device agent 208 to fulfill the request.

In addition to exposing a ListTopics( ) API call to the robotic device application 206, the client device agent 208 may expose a GetData( ) API call to the robotic device application 206 that the robotic device application 206 may submit to the client device agent 208 to request data, such as state information, from one or more robotic devices. This API call from the robotic device application 206 may specify an identifier of the robotic device from which the data is to be obtained, as well as identifiers corresponding to the topics that are used by the robotic device to publish the requested data. In response to obtaining this API call from the robotic device application 206, the client device agent 208 may transmit this API call to the request processing sub-system 212.

In response to obtaining the GetData( ) API call from the client device agent 208, the request processing sub-system 212 may generate a token that may be used by the client device agent 208 to submit queries, over time, to the request processing sub-system 212 to obtain the requested state information from the particular topic. The token may specify at least an identifier of the robotic device application 206, an identifier of the client device 204, an identifier of the robotic device from which the state information is to be obtained, and identifiers corresponding to the topics into which the state information is published. Additionally, the token may include credential information usable by the request processing sub-system 212 to authenticate the request from the client device agent 208 and to determine whether the robotic device application 206 specified therein is authorized to obtain the requested state information. In an embodiment, the credential information includes a combination of a username and corresponding password of the customer, the robotic device application, or other entity of the client device. The credential information can also include cryptographic information that is verifiable by the request processing sub-system 212 or other entity of the robotic device management service. The request processing sub-system 212 may provide this token to the client device agent 208, which may be used to query the robotic device management service 104 periodically or in response to a triggering event (e.g., request from the ROS tool, detection of an incident within the on-premises network of the robotic device 106, etc.), to obtain state information of the robotic device.

The request processing sub-system 212 may also register this request to obtain state information within the state information database 214 to indicate that a request has been received to obtain state information from the robotic device. The registration of the request may result in an entry in the database 214 that specifies an identifier of the token issued to the client device 204 for the robotic device application 206, as well as the parameters of the request to obtain the state information (e.g., topic from which state information is to be obtained, identifier of the robotic device, identifier of the client device 204 and/or robotic device application 206, conditions for terminating further retrieval of state information from the robotic device, etc.). This entry in the state information database 214 may be accessed by the robotic device agent installed on the client device to allow the robotic device agent to identify newly obtained requests for state information from the robotic device. This may cause the robotic device agent to begin obtaining the requested state information published to the specified topics and from the various processors or nodes of the robotic device. The robotic device agent may transmit the state information to the robotic device management service 202, which may store this newly obtained state information in the state information database 214. Further, the robotic device management service 202 may update a queue to indicate that the newly obtained state information is available for the robotic device application 206. As the client device agent 208 obtains state information from the request processing sub-system 212, the request processing sub-system 212 may update the queue to remove the indication of availability of the state information for the robotic device application 206.

In an embodiment, the client device agent 208 submits a request to the request processing sub-system 212 to obtain state information from one or more topics maintained by a robotic device. The request may include the aforementioned token, which may be used by the request processing sub-system 212 to authenticate the request and to identify the state information that is being requested. Using the token, the request processing sub-system 212 may evaluate the queue to determine whether state information is stored within the state information database 214 that may be provided to the client device agent 208 to fulfill the request. If state information is available within the state information database 214, the request processing sub-system 212 may obtain the state information from the state information database 214 and provide the state information to the client device agent 208. Further, the request processing sub-system 212 may update the queue to remove the entry corresponding to the availability of the state information from the robotic device to the robotic device application 206. Thus, if no new state information is obtained and the client device agent 208 submits another request that includes the token, the request processing sub-system 212 may determine that no new state information is available for the robotic device application 206.

Figure 3:
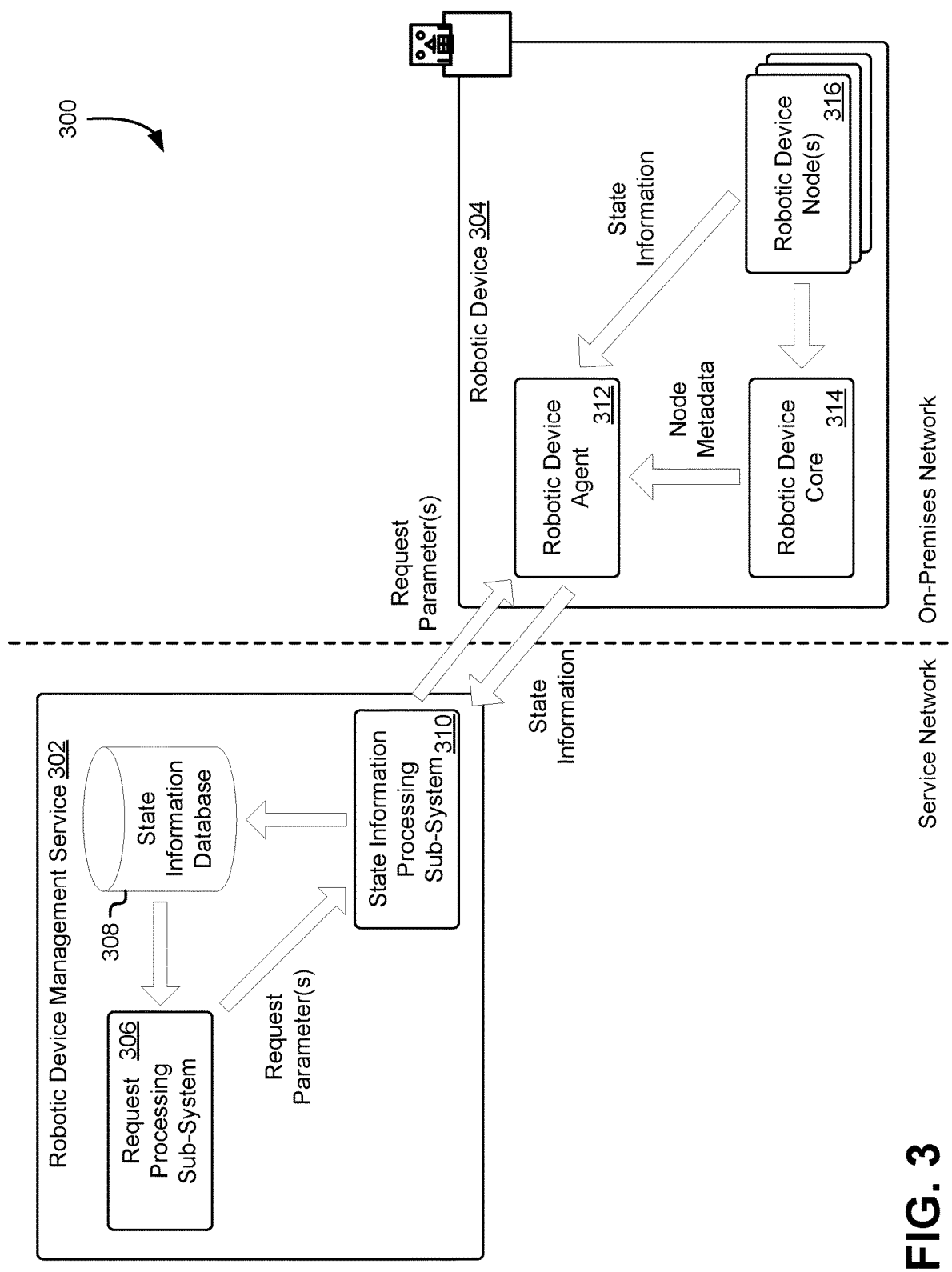
FIG. 3 shows an illustrative example of a system in which a robotic device, via a robotic device agent, processes request parameters corresponding to requests from a client device to obtain state information for the robotic device and provides the requested state information in accordance with at least one embodiment.

FIG. 3 shows an illustrative example of a system 300 in which a robotic device 304, via a robotic device agent 312, processes request parameters corresponding to requests from a client device to obtain state information for the robotic device 304 and provides the requested state information in accordance with at least one embodiment. In the system 300, a robotic device agent 312 installed on a robotic device 304 operating within an on-premises network or other communications network distinct from a communications network of the robotic device management service 302 transmits a request to a state information processing sub-system 310 of the robotic device management service 302 to determine whether any requests have been obtained by the robotic device management service 302 for state information from the robotic device 304. The state information processing sub-system 310 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

In an embodiment, the robotic device agent 312 obtains, from a robotic device core 314 of the robotic device 304, metadata from one or more robotic device nodes 316. This metadata may specify identifiers corresponding to a set of topics maintained by the robotic device 304 to which state information is published. The robotic device core 314 may be an application, process, or other executable code that, if executed, causes the robotic device 304 to obtain metadata from each of the set of robotic device nodes 316 (e.g., processors, etc.) of the robotic device 304. This metadata may specify the state information being generated or otherwise obtained by the corresponding robotic device node 316. Further, the metadata may specify the one or more topics to which the robotic device node 316 is publishing its state information.

The robotic device agent 312 may transmit information to the state information processing sub-system 310 that specifies the one or more topics of the robotic device 304 to which the robotic device nodes 316 publish state information of the robotic device 304. The state information processing sub-system 310 may update an entry corresponding to the robotic device 304 in the state information database 308 to specify the available topics for the robotic device 304. This may enable the request processing sub-system 306 of the robotic device management service 302 to provide, to a client device agent, information specifying the available topics for a robotic device 304 in response to a ListTopics( ) API call from the client device agent. As noted above, the ListTopics( ) API call may specify an identifier corresponding to the one or more robotic devices for which the robotic device application installed on the client device may require state information or other data. The request processing sub-system 306 may use the provided identifiers corresponding to the one or more robotic devices 304 to query the state information database 308 and obtain, from entries corresponding to these one or more robotic devices 304, the topics to which state information of these robotic devices 304 are published.

As noted above, a client device agent, on behalf of a robotic device application installed on a client device, may submit a request to the robotic device management service 302 to obtain state information for a particular topic from a robotic device 304. In response to obtaining this request from the client device agent, the request processing sub-system 306 may generate a token that may be used by the client device agent to submit queries, over time, to the request processing sub-system 306 to obtain the requested state information from the particular topic. Additionally, in response to the request from the client device agent, the request processing sub-system 306 may also register this request to obtain state information within the state information database 308 to indicate that a request has been received to obtain state information from the robotic device. The registration of the request may result in an entry in the database 308 that specifies an identifier of the token issued to the client device for the robotic device application, as well as the parameters of the request to obtain the state information. This entry in the state information database 308 may be accessed by the robotic device agent 312 installed on the client device to allow the robotic device agent 312 to identify newly obtained requests for state information from the robotic device 304. Alternatively, as illustrated in FIG. 3, the state information processing sub-system 310 may obtain the request parameters from the request processing sub-system 306. This may cause the state information processing sub-system 310 to provide the request parameters to the robotic device agent 312.

Based on the parameters of the request from the client device agent, the robotic device agent 312 may determine what state information is required to fulfill the request. For instance, if the request parameters specify the one or more topics from which state information is to be obtained, the robotic device agent 312 may obtain, from the robotic device core 314, metadata of the various robotic device nodes 316. The robotic device agent 312 may use this metadata to identify which robotic device nodes 316 of the set of robotic device nodes of the robotic device 304 are publishing state information to the topics specified in the request parameters obtained from the state information database 308 or from the state information processing sub-system 310. The robotic device agent 312 may access the robotic device nodes 316 that generate the requested state information and publish this requested state information into the topics specified in the request parameters to obtain this state information of the robotic device 304.

In an embodiment, the robotic device agent 312 transmits the state information from the one or more robotic device nodes 316 to the state information processing sub-system 310. The state information may be provided with the request parameters originally provided by the state information processing sub-system 310 or otherwise obtained from the state information database 308 by the robotic device agent 312. In response to obtaining the state information and request parameters from the robotic device agent 312, the state information processing sub-system 310 may identify, from the state information database 308, one or more entries corresponding to the topics to which the state information is published. The state information processing sub-system 310 may update these entries to specify the storage location of the obtained state information within the robotic device management service 302. Further, the state information processing sub-system 310 may update a queue to indicate that the state information for the corresponding topics is available for retrieval from the robotic device management service 302.

As noted above, a client device agent may submit a request to the request processing sub-system 306 to obtain state information for one or more topics. This request may include a token, which may be used to identify the topics for which state information is to be obtained. The request processing sub-system 306, in response to this request, may evaluate the queue to determine whether state information is now available that may be provided to fulfill the request. If so, the request processing sub-system 306 may query the state information database 308 to identify the storage location of the state information for the specified topics. Based on the results of the query, the request processing sub-system 306 may obtain the state information from the corresponding storage locations and provide the state information to the client device agent to fulfill the request. Further, the request processing sub-system 306 may update the queue to remove the entry corresponding to the availability of the state information. Thus, if another request is obtained from the client device agent to obtain the state information, the request processing sub-system 306 may determine that no new state information is available for fulfillment of the request.

In an embodiment, the robotic device agent 312 continues to provide state information for the topics specified in the request parameters as it is generated by the robotic device nodes 316 and published to these topics. In response to obtaining new state information for a set of topics, the state information processing sub-system 310 may evaluate entries corresponding to these topics in the state information database 308 to determine whether the newly obtained state information supersedes existing state information for these topics. If so, the state information processing sub-system 310 may overwrite the state information stored in storage locations of the robotic device management service 302 with the newly obtained state information from the robotic device agent 312. Further, the state information processing sub-system 310 may update the entries corresponding to these topics in the state information database 308 to specify the storage location of the newly obtained state information. The state information processing sub-system 310 may also update the queue to indicate the availability of the newly obtained state information. Any entries in the queue corresponding to the overwritten state information may be removed from the queue.

Figure 4:
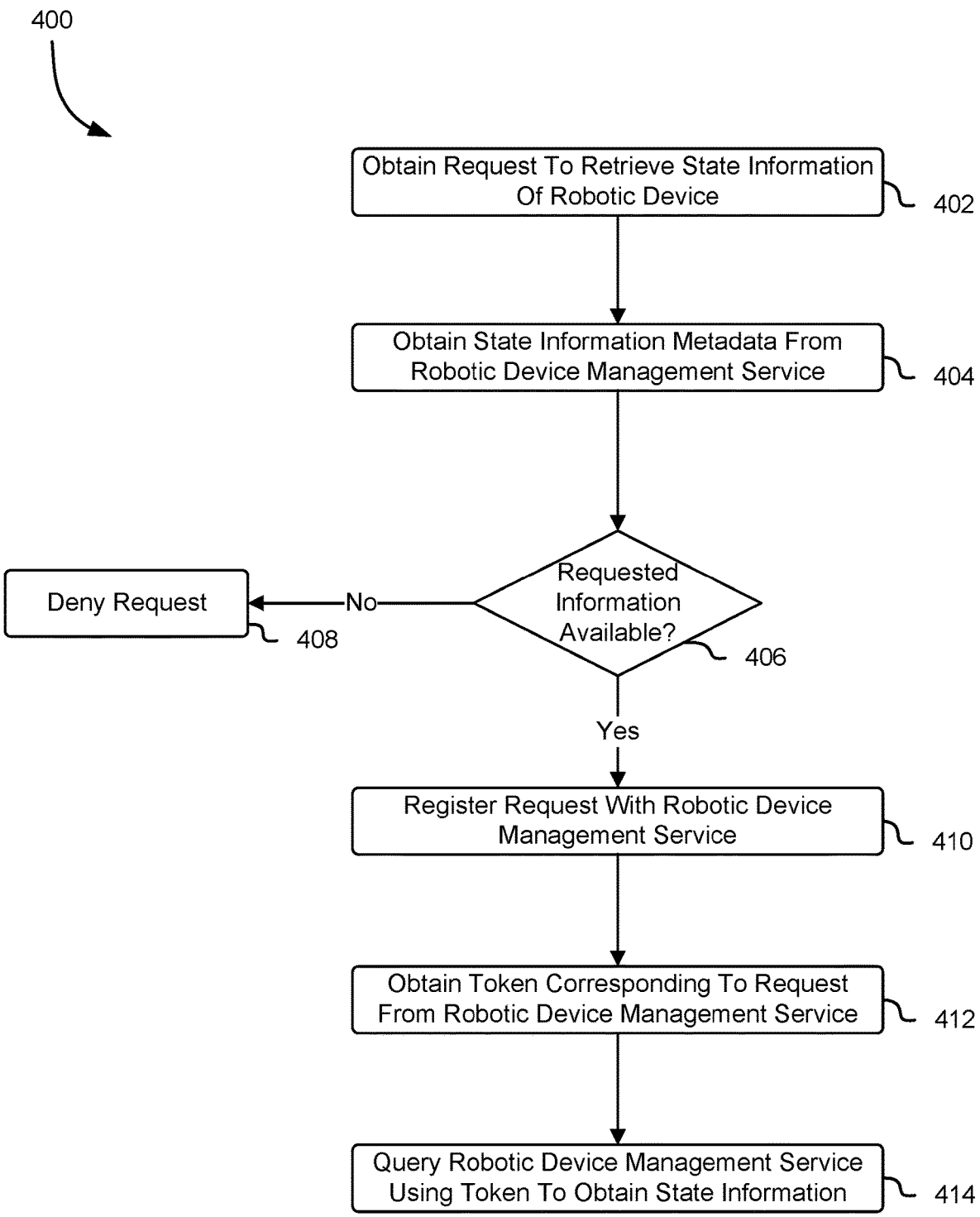
FIG. 4 shows an illustrative example of a process for obtaining state information of a robotic device through use of a token corresponding to a request from a client device for the state information in accordance with at least one embodiment.

FIG. 4 shows an illustrative example of a process 400 for obtaining state information of a robotic device through use of a token corresponding to a request from a client device for the state information in accordance with at least one embodiment. The process 400 may be performed by a client device agent, installed on a client device, which may obtain requests from one or more robotic device applications operating on the client device and transmit these requests to a robotic device management service to obtain state information usable by these robotic device applications. This token may be submitted with future requests to obtain state information as it is obtained by the robotic device management service from the myriad robotic devices associated with a customer account tied to the client device agent and the client device itself.

At any time, a client device agent installed on a client device may obtain 402 a request from a robotic device application operating on the client device to retrieve state information of a robotic device. The request may specify an identifier of the robotic device from which the state information is to be obtained, as well as identifiers corresponding to topics to which the state information may be published by the robotic device identified in the request. In response to the request from the robotic device application, the client device agent may access the robotic device management service and obtain 404 state information metadata from the robotic device management service. This state information metadata may specify the topics to which a robotic device may be publishing state information and from which state information may be obtained.

The client device agent may evaluate the state information metadata from the robotic device management service to determine 406 whether the requested state information may be obtained from the robotic device specified in the request from the robotic device application. For instance, the client device agent may determine whether the state information metadata for the robotic device identified in the request specifies that state information is being published by the robotic device into the one or more topics specified in the request from the robotic device application. If the client device agent determines that the requested state information is not available from the robotic device (e.g., the robotic device does not maintain a topic specified in the request, etc.), the client device agent may deny 408 the request. For instance, the client device agent may transmit a notification to the robotic device application to indicate that the specified topic is not available on the robotic device. Additionally, the client device agent may provide data specifying the topics that are available on the robotic device specified by the robotic device application. A robotic device application may use this data to submit new requests for state information specifying valid topics for the robotic device.

If the client device agent determines that the requested state information may be obtained from the robotic device, the client device agent may register 410 the request from the robotic device application with the robotic device management service. For instance, the client device agent may transmit a GetData( ) API call to the robotic device management service to request state information associated with one or more topics from a robotic device. This API call may specify an identifier of the topic from which the state information is to be obtained, as well as an identifier of the robotic device that publishes the state information to the specified topic. Further, the GetData( ) API call may specify an identifier of the client device and/or of the robotic device application that submitted the request, via the client device agent, to the robotic device management service.

In response to the API call from the client device agent, the robotic device management service may register the request within a state information database and issue a token corresponding to the state information request to the client device agent. The token may specify at least an identifier of the robotic device application, an identifier of the client device, an identifier of the robotic device from which the state information is to be obtained, and identifiers corresponding to the topics into which the state information is published. Additionally, the token may include credential information usable by the robotic device management service to authenticate requests from the client device agent and to determine whether the robotic device application specified therein is authorized to obtain the requested state information. The robotic device management service may issue the token to the client device agent, which may obtain 412 the token corresponding to the GetData( ) API call.

Using the token, the client device agent may query 414 the robotic device management service to obtain state information as it is provided to the robotic device management service by the corresponding robotic device. For instance, the client device agent may query the robotic device management service periodically or in response to a triggering event (e.g., request from the robotic device application, detection of an incident within the on-premises network of the robotic device, etc.), to obtain state information of the robotic device. The robotic device management service may also register this received API call or other request within its database to indicate that a request has been received to obtain state information from the robotic device. The registration of the request may result in an entry in the database that specifies an identifier of the token issued to the client device, as well as the parameters of the request to obtain the state information.

Figure 5:
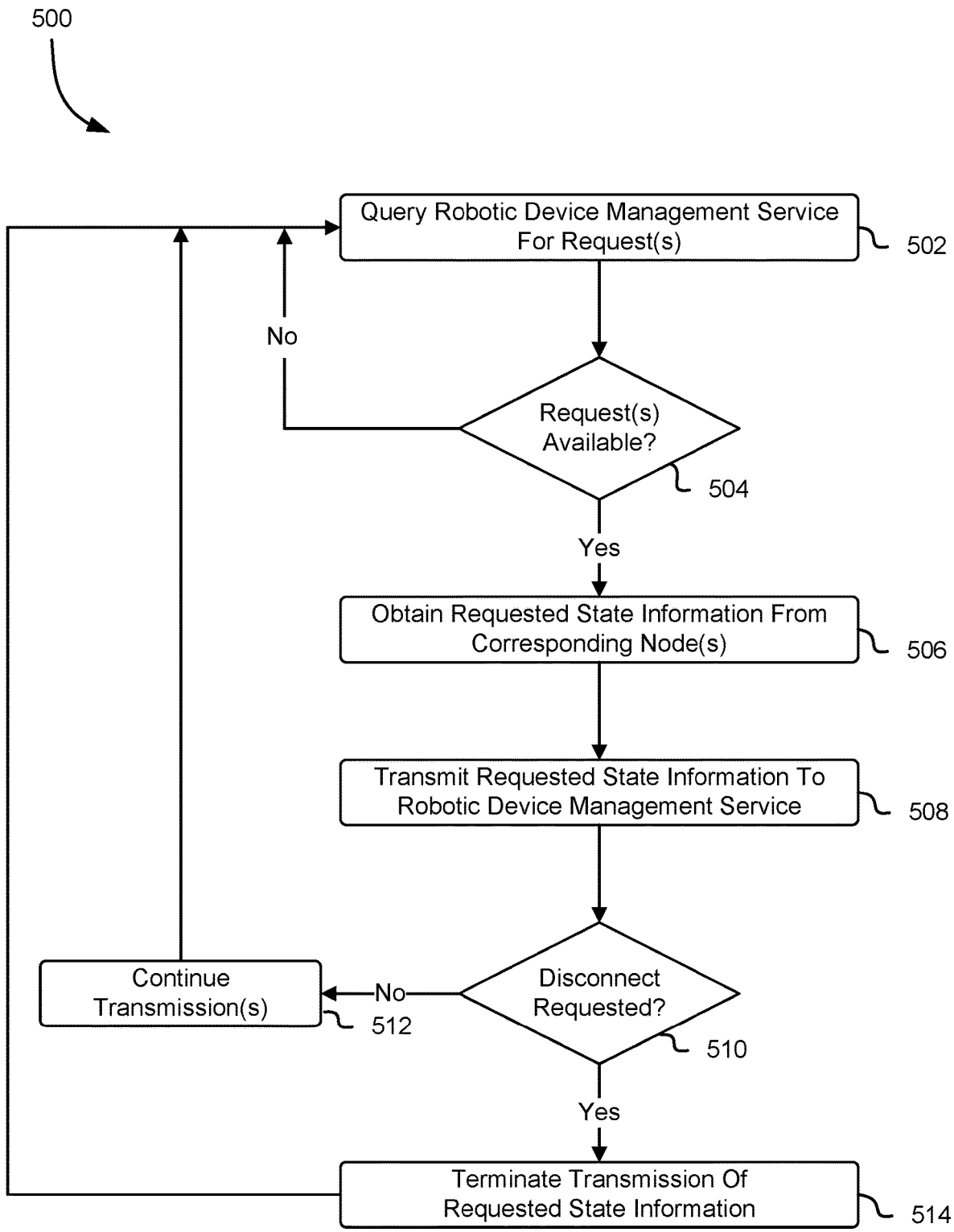
FIG. 5 shows an illustrative example of a process for transmitting state information to a robotic device management service as a result of a set of requests for the state information being available for processing from a set of client devices in accordance with at least one embodiment.

FIG. 5 shows an illustrative example of a process 500 for transmitting state information to a robotic device management service as a result of a set of requests for the state information being available for processing from a set of client devices in accordance with at least one embodiment. The process 500 may be performed by a robotic device agent installed on a robotic device operating in an on-premises network or other communications network that may be distinct from a communications network of a client device and of the robotic device management service. In an embodiment, the robotic device agent queries 502 the robotic device management service for any requests that may have been obtained by the robotic device management service from client devices for state information published to one or more topics maintained by the robotic device. For instance, the robotic device agent may query a state information database of the robotic device management service to identify an entry in the state information database that may specify newly obtained requests for state information. Alternatively, robotic device agent may transmit a request to a state information processing sub-system of the robotic device management service to obtain the request parameters corresponding to any requests to obtain state information associated with one or more topics maintained by the robotic device. This may cause the state information processing sub-system to provide the request parameters to the robotic device agent, if available.

From the query or in response to its request to identify any pending requests for state information from the robotic device, the robotic device agent may determine 504 whether any requests are available for processing. If the robotic device agent determines that no new requests have been received for state information from the robotic device, the robotic device agent may submit a new query or request at a later time for newly obtained requests from client devices. For instance, the robotic device agent may, periodically or in response to a triggering event, continue to query the robotic device management service to identify any requests that may have been obtained since the previous query submitted by the robotic device agent to the robotic device management service.

If the robotic device agent determines that one or more requests are available for processing, the robotic device agent may obtain the parameters of the one or more requests. These parameters may specify the topics from which a client device has requested state information for use by a robotic device application installed on the client device. Based on these parameters, the robotic device agent may obtain 506 the requested state information from a set of robotic device nodes that generate the requested state information and publish said state information to the topics specified in the request parameters. In an embodiment, to identify the robotic device nodes that generate and publish the requested state information, the robotic device agent may obtain, from a robotic device core, metadata that includes a mapping of robotic device nodes to topics and state information generated by these nodes. Based on the mapping specified in the metadata from the robotic device core, the robotic device agent may access the robotic device nodes that maintain the state information associated with the topics specified in the request parameters.

The robotic device agent may transmit 508 the obtained state information to the robotic device management service for distribution to the client devices that have requested state information tied to one or more topics of the robotic device. This may cause the robotic device management service to update its state information database to indicate storage locations of the obtained state information. In an embodiment, the robotic device management service updates a queue to indicate that the state information is available for retrieval. For instance, if a client device agent submits a query that includes a token corresponding to a request to obtain state information for a particular topic of a robotic device, the robotic device management service may evaluate the queue to determine whether any state information corresponding to the particular topic has been provided by the robotic device agent. Thus, transmission of the state information to the robotic device management service may cause the robotic device management service to make the state information available to client devices that have requested state information corresponding to the topic to which the state information provided by the robotic device agent was published.

The robotic device agent may continue to query the state information database of the robotic device management service to determine 510 whether a disconnect request has been submitted by a client device agent to terminate transmission of state information published to the topics specified in the original request parameters. If a disconnect request has not been obtained by the robotic device management service, the robotic device agent may continue 512 to transmit state information to the robotic device management service. For instance, periodically or in response to a triggering event (e.g., metadata of the various robotic device nodes is updated, a change to the status of the robotic device, etc.), the robotic device agent may determine whether new state information has been generated for one or more topics. If new state information has been generated and published by the robotic device nodes, the robotic device agent may obtain this new state information and transmit this new state information to the robotic device management service. The robotic device management service may overwrite any existing state information for these topics stored within a repository of the robotic device management service with the newly obtained state information for these topics. While continuing transmission of newly generated state information, the robotic device agent may continue to query 502 the robotic device management service for any new requests for state information.

However, if the robotic device agent obtains, from the robotic device management service, a disconnect request, the robotic device agent may terminate 514 further transmission of state information from topics specified in the request parameters. It should be noted that this state information may still be provided to the robotic device management service in response to other requests from client devices. For instance, state information may be provided to the robotic device management service with an identifier corresponding to the client devices and/or an identifier corresponding to the robotic device application for which the state information is intended for. Thus, in the queue, the robotic device management service may parse the state information according to the intended destination for the state information. The robotic device agent may continue to query 502 the robotic device management service for any new requests for state information from the robotic device and published to one or more topics maintained by the robotic device.

Figure 6:
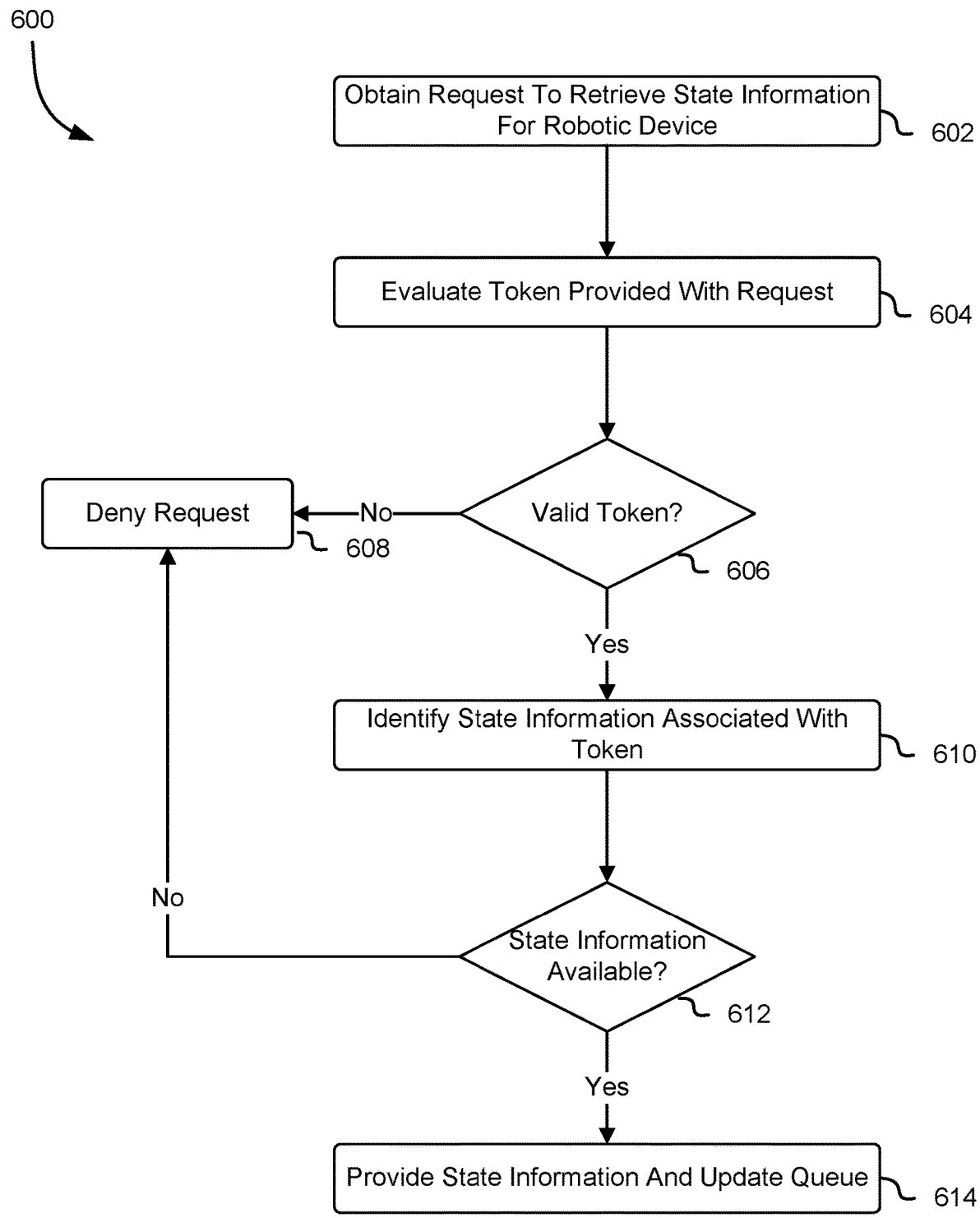
FIG. 6 shows an illustrative example of a process for providing state information of a robotic device to a client device agent in response to a request to retrieve the state information in accordance with at least one embodiment.

FIG. 6 shows an illustrative example of a process 600 for providing state information of a robotic device to a client device agent in response to a request to retrieve the state information in accordance with at least one embodiment. The process 600 may be performed by the request processing sub-system of the robotic device management service or by any other system or process of the robotic device management service that may process state information from robotic devices for distribution to one or more client devices. At any time, the request processing sub-system obtains 602, from a client device agent, a request to retrieve state information for a particular device. The request may include a token previously issued to the client device agent by the robotic device management service, as described above in connection with FIGS. 2 and 4. In response to the request from the client device agent, the request processing sub-system may evaluate 604 the provided token to determine 606 whether the token is valid. As noted above, the token may include credential information usable to authenticate the request. The request processing sub-system may determine whether the credential information specified in the token is valid (e.g., has not expired, corresponds to an identity of the client device, was issued by the robotic device management service, etc.). Further, using the token, the request processing sub-system may determine whether the client device agent is authorized to obtain the requested state information. For instance, using information specified in the token (e.g., identifier corresponding to the client device, identifier corresponding to the robotic device application of the client device requesting the state information, etc.), the request processing sub-system may identify a set of policies applicable to the request, to the client device, and to the application from a customer's account. Using these policies, the request processing sub-system may determine whether the client device agent is authorized to obtain the requested state information.

If the token provided with the request is not valid, the request processing sub-system may deny 608 the request. The request processing sub-system may transmit a notification to the client device agent to indicate that the request was denied, as well as the rationale for the denial of the request. For instance, the request processing sub-system may indicate that the token has expired. Alternatively, the request processing sub-system may indicate that the robotic device application or the client device itself does not have authorization to obtain the requested state information from the robotic device.

However, if the token provided with the request is valid, the request processing sub-system may identify 610 the state information associated with the token. For instance, the request processing sub-system may identify, from the token, the one or more topics from which the robotic device application of the client device has requested state information. Alternatively, if the token includes an identifier corresponding to an entry within the state information database corresponding to the robotic device application, the request processing sub-system may query the state information database to identify, from the entry corresponding to the robotic device application, which topics the robotic device application requires state information from. Using this information from either the token itself or from the entry corresponding to the robotic device application from the state information database, the request processing sub-system may determine 612 whether state information is available for fulfillment of the request.

In an embodiment, the robotic device management service maintains a queue that may be used to indicate what state information has been uploaded to the robotic device management service by myriad robotic devices interacting with the robotic device management service. An entry within the queue may specify an identifier corresponding to the uploaded state information, an identifier corresponding to the topic to which the state information was published, an identifier of the robotic device from which the state information was obtained, and an identifier corresponding to the robotic device application that requested the state information. The request processing sub-system may evaluate this queue to determine whether state information has been uploaded to the robotic device management service that is available to the robotic device application of the client device. If there is no entry in the queue corresponding to the availability of state information requested by the client device agent, the request processing sub-system may deny 608 the request, as the requested state information may not be available for retrieval.

If the state information requested by the client device agent is available, the request processing sub-system may query the state information database to determine the storage location of the requested state information. The request processing sub-system may retrieve the requested state information from the identified storage location and provide 614 the state information to the client device agent to fulfill the request. Further, the request processing sub-system may update the queue to remove the entry corresponding to the availability of the state information for the robotic device application of the client device. This may prevent the request processing sub-system from providing duplicates of the state information to the client device agent in response to later requests to obtain state information from a robotic device. Thus, the queue may be used to indicate the presence of newly uploaded state information from the robotic device, which may be used to overwrite any outdated state information.

Figure 7:
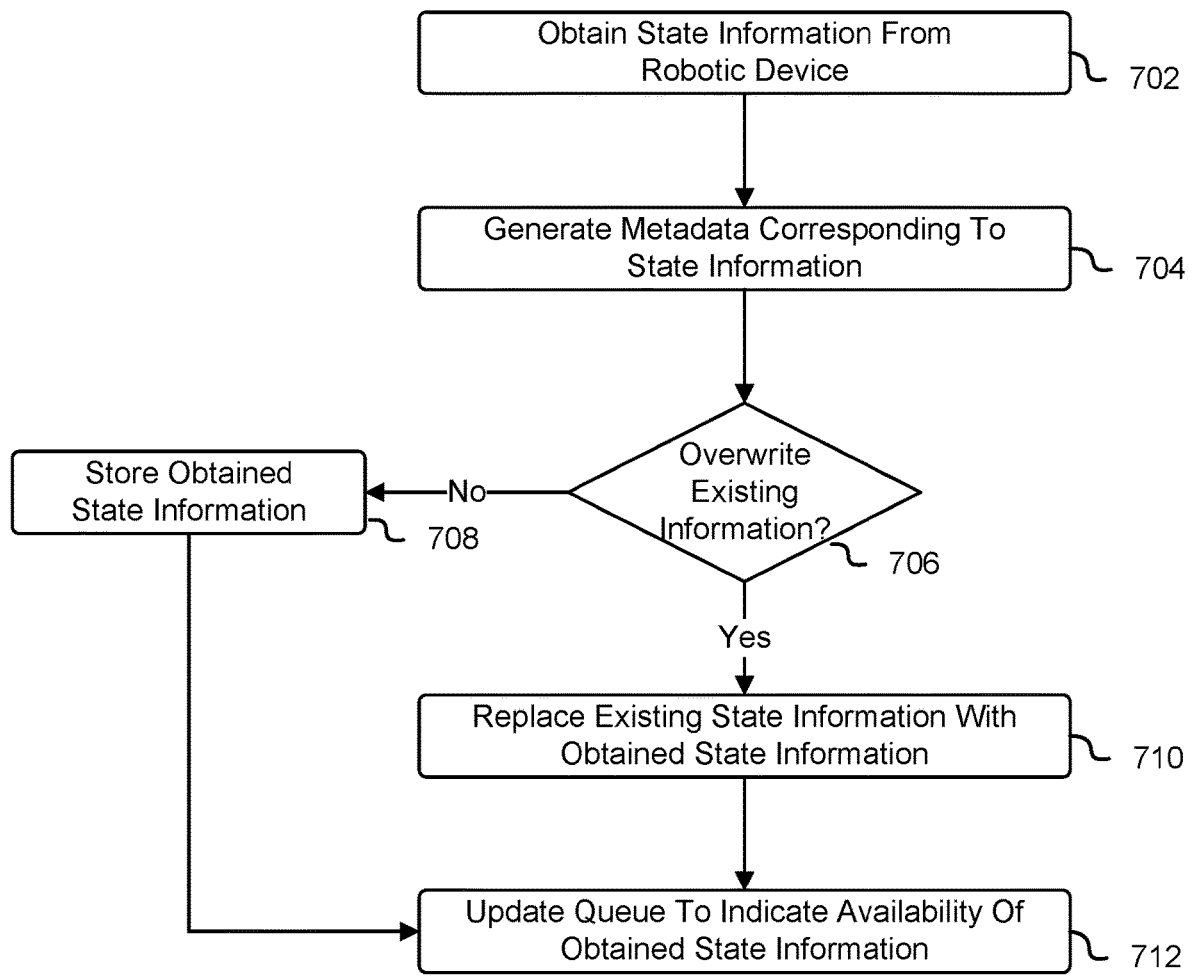
FIG. 7 shows an illustrative example of a process for making available, via a queue, newly obtained state information from a robotic device in accordance with at least one embodiment.

As noted above, a state information processing sub-system may obtain, from robotic devices, state information corresponding to one or more topics from which a robotic device application of a client device may opt to obtain state information from. This state information may be stored within a repository of the robotic device management service. Further, the state information processing sub-system may update a queue of the robotic device management service to indicate that this newly obtained state information is available for retrieval by a client device agent. Accordingly, FIG. 7 shows an illustrative example of a process 700 for making available, via a queue, newly obtained state information from a robotic device in accordance with at least one embodiment. The process 700 may be performed by the aforementioned state information processing sub-system of the robotic device management service, which is described in greater detail above in connection with FIG. 3.

At any time, the state information processing sub-system may obtain 702 state information from a robotic device via a robotic device agent installed on the robotic device. The robotic device agent may provide this state information in response to obtaining a set of request parameters corresponding to a request from a client device agent to obtain state information published to a particular topic of the robotic device. In addition to the state information, the state information processing sub-system may obtain additional information usable to determine for which entity the state information is for. For instance, this additional information may specify at least an identifier corresponding to the topic to which the state information was published, an identifier corresponding to the client device for which the state information is being made available, and an identifier corresponding to the robotic device application installed on the client device for which the state information is being made available. Alternatively, or additionally, the additional information may specify an identifier corresponding to the token issued to the client device agent.

Based on the additional information provided with the state information, the state information processing sub-system may generate 704 metadata corresponding to the newly obtained state information. This metadata may specify at least a set of descriptors usable to determine the contents of the state information (e.g., metrics, time ranges, robotic device parameters, etc.) as well as an identifier of the state information itself, an identifier corresponding to the topic to which the state information was published, an identifier corresponding to the client device for which the state information is being made available, and an identifier corresponding to the robotic device application of the client device for which the state information is being made available. This metadata may be stored in the state information database to enable queries for this state information to identify a corresponding entry in the database that includes the metadata.

The state information processing sub-system may also determine 706 whether to overwrite any existing state information stored within a repository of the robotic device management service. For instance, if the newly obtained state information includes additional data that supersedes existing data from previously provided state information for the same metrics and intended robotic device application of a client device, the state information processing sub-system may determine that the previously provided state information may be overwritten, as the newly obtained state information includes not only the data specified in the previously provided state information but also additional and contemporaneous data generated by the robotic device. However, in some instances, the newly obtained state information may be of first instance (e.g., the state information provided by the robotic device agent is the initial transmission of state information in response to a request from a client device agent). In such instances, there may be no state information that needs to be overwritten to introduce the newly obtained state information.

If the state information processing sub-system determines that there is no existing state information that needs to be overwritten in response to obtaining the new state information from the robotic device agent, the state information processing sub-system may store 708 the obtained state information within a repository of the robotic device management service and update the state information database to indicate the storage location of this newly obtained state information. However, if the state information processing sub-system determines that there is existing state information that needs to be overwritten in response to obtaining the new state information from the robotic device agent, the state information processing sub-system may replace 710 the existing state information with the newly obtained state information. This may include overwriting the existing state information with the newly obtained state information in the repository of the robotic device management service.

The state information processing sub-system may additionally update 712 the queue of the robotic device management service to indicate that the newly obtained state information is available for retrieval. If the queue includes an entry corresponding to the availability of the overwritten state information, the state information processing sub-system may remove this entry from the queue and replace it with a new entry corresponding to the newly obtained state information stored in the repository of the robotic device management service. Thus, as state information is obtained from robotic devices, the queue may be updated to indicate that this state information is available to the client devices that have requested this state information.

Figure 8:
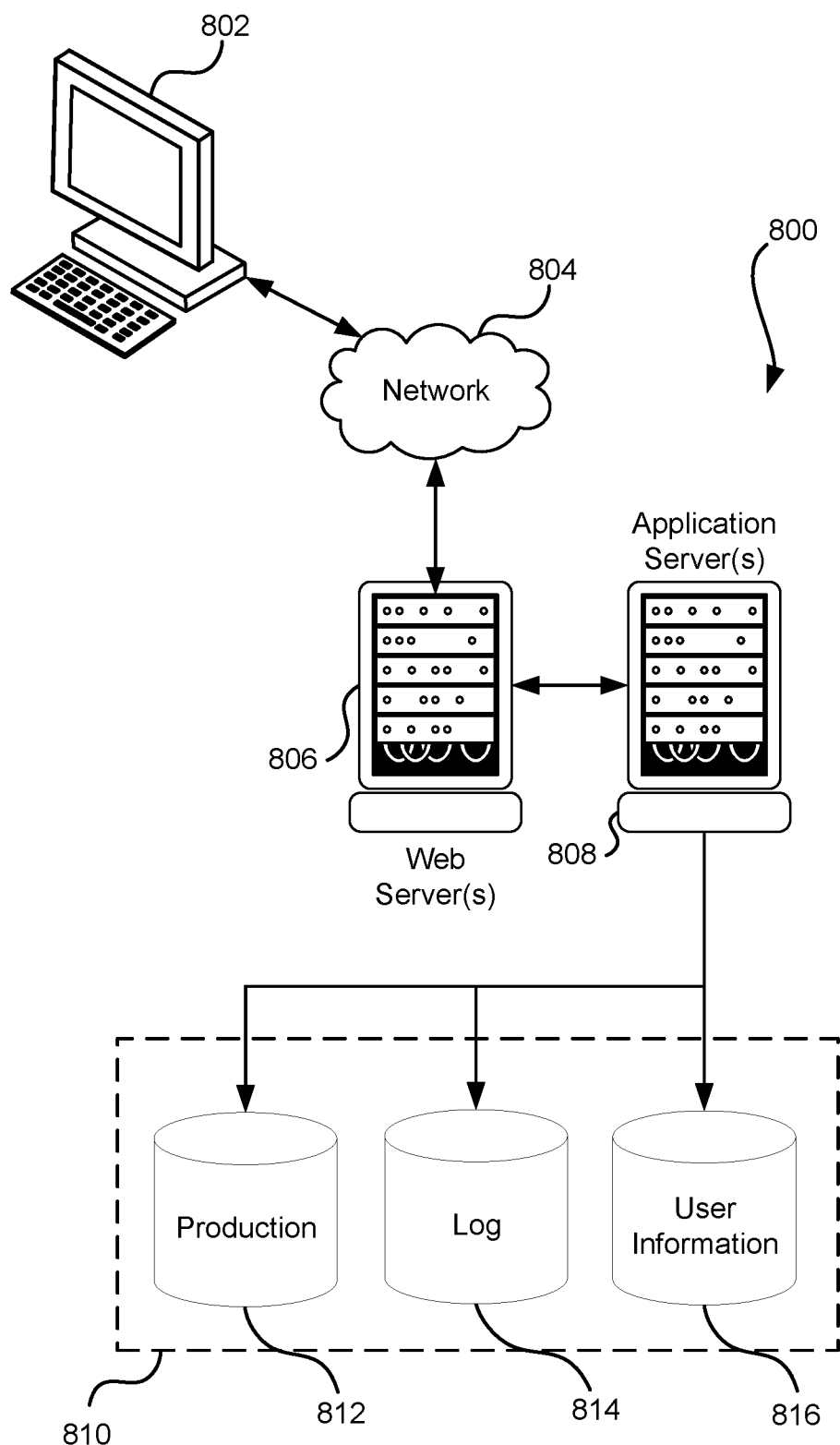
FIG. 8 shows an illustrative example of a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a client device operating in a first network, a first request to register the client device to be able to obtain state information of a robotic device operating in a second network;
    identifying, based at least in part on a set of parameters of the first request and metadata specifying available data corresponding to the robotic device, a repository for storage of the state information, the robotic device registered to the repository to establish a shared secret between the robotic device and the repository;
    providing, to the client device, a token usable by the client device to access the repository to obtain the state information, the token comprising an identifier, the identifier corresponding to a topic into which state information is published;
    obtaining, from the client device, a second request to obtain the state information corresponding to the topic maintained on the robotic device from the repository, the second request including the token usable to identify the topic from which the state information of the robotic device is being requested;
    publishing, to the repository, a notification that, as a result of being processed by the robotic device, causes the robotic device to transmit the state information to the repository;
    obtaining, from the robotic device, the state information; and
    providing the state information to the client device to fulfill the second request.

2. The computer-implemented method of claim 1, wherein providing the state information to the client device to fulfill the second request further includes:
    updating a queue to indicate availability of the state information;
    determining, based at least in part on the token and the queue, that the state information is available from the repository; and
    transmitting, to the client device, the state information.

3. The computer-implemented method of claim 1, further comprising:
    identifying, from the repository, second state information previously provided by the robotic device;
    determining that the state information supersedes the second state information; and
    overwriting the second state information with the state information in the repository.

4. The computer-implemented method of claim 1, further comprising:
    obtaining, from the client device, another request to obtain an output from the robotic device, the another request specifying a query that, if processed by the robotic device, causes the robotic device to process additional state information to obtain the output;
    transmitting the query to the robotic device to cause the robotic device to process the additional state information to obtain the output; and
    providing, to the client device, the output.

5. A system, comprising:
one or more processors;
memory that stores computer-executable instructions that, if executed, cause the one or more processors to:
obtain, from a client device operating in a first network, a request to retrieve data generated by a robotic device operating in a second network, the request including a token specifying an identifier corresponding to the data, the identifier corresponding to a topic for which data is available, the token usable to identify the topic from which the data is being requested;
query, using the identifier corresponding to the data, a database to determine that the data is available at a storage location of the system as a result of the data being obtained from the robotic device; and
as a result of an indication being published to a repository, provide the data to the client device to fulfill the request.

6. The system of claim 5, wherein the instructions further cause the one or more processors to:
obtain, from the client device, a structured programming language query that, if executed by the robotic device, causes the robotic device to process second data of the robotic device to generate an output;
transmit the structured programming language query to the robotic device;
obtain, from the robotic device, the output; and
provide the output to the client device.

7. The system of claim 5, wherein the instructions further cause the one or more processors to:
obtain, from the robotic device, second data that supersedes the data available at the storage location of the system;
overwrite the data available at the storage location of the system with the second data;
replace, within the repository, the indication that the data is available at the storage location with a new indication that the second data is available at the storage location; and
provide the second data in response to requests to obtain the data of the robotic device.

8. The system of claim 5, wherein the request from the client device is generated by a Robot Operating System application installed on the client device.

9. The system of claim 5, wherein the data comprises state information of the robotic device, the state information usable to determine metrics of the robotic device and information of an environment in which the robotic device is operating.

10. The system of claim 5, wherein the token is provided to the client device in response to a second request, from the client device, to register the client device to obtain the data of the robotic device as the data is obtained from the robotic device.

11. The system of claim 10, wherein the instructions further cause the one or more processors to provide, to the robotic device, parameters of the second request to cause the robotic device to generate the data in accordance with the parameters.

12. The system of claim 5, wherein the instructions further cause the one or more processors to remove, from the repository, the indication as a result of the data being successfully provided to the client device to fulfill the request.

13. A non-transitory computer-readable storage medium having stored thereon executable instructions that, as a result of being executed by one or more processors of a computer system, cause the computer system to at least:
obtain, from a first agent operating in a first network, a first request to obtain data from a second agent operating in a second network;
provide, in response to the first request, a token usable by the first agent to obtain the data, the token specifying an identifier, the identifier corresponding to a topic of the data of the second agent that is being requested;
transmit parameters of the first request to the second agent to cause the second agent to generate the data;
obtain, from the second agent, the data;
obtain, from the first agent, a second request to obtain the data, the second request including the token;
determine, based at least in part on information specified in the token, that the data is available for retrieval; and
provide the data to fulfill the second request.

14. The non-transitory computer-readable storage medium of claim 13, wherein the information specified in the token includes an identifier of a client device that executes the first agent, an identifier corresponding to a robotic device that executes the second agent, and an identifier corresponding to the data.

15. The non-transitory computer-readable storage medium of claim 13, wherein the instructions that cause the computer system to determine that the data is available for retrieval further cause the computer system to query a queue specifying available data for distribution to client devices to identify an entry in the queue that specifies that the data is available within a repository.

16. The non-transitory computer-readable storage medium of claim 13, wherein the parameters of the first request are transmitted to the second agent in response to a request from the second agent to obtain any parameters corresponding to requests obtained from client devices for robotic device data.

17. The non-transitory computer-readable storage medium of claim 13, wherein the instructions further cause the computer system to:
evaluate the data to determine whether the data supersedes other data previously provided by the second agent; and
overwrite the other data with the data as a result of a determination that the data supersedes the other data previously provided by the second agent.

18. The non-transitory computer-readable storage medium of claim 13, wherein the instructions further cause the computer system to:
obtain, from the first agent, executable instructions that, if executed by the second agent, cause the second agent to process the data to generate an output;
transmit the executable instructions to the second agent to cause the second agent to execute the executable instructions;
obtain, from the second agent, the output; and
provide the output to the first agent.

19. The non-transitory computer-readable storage medium of claim 13, wherein the first request is obtained by the first agent from a robotic device application installed on a client device operating in the first network.

20. The non-transitory computer-readable storage medium of claim 13, wherein the instructions further cause the computer system to:
obtain, from the first agent, a second request to cause the second agent to cease generating the data; and transmit second parameters of the second request to the second agent to cause the second agent to cease generating the data.

\* \* \* \* \*